Figure 1:
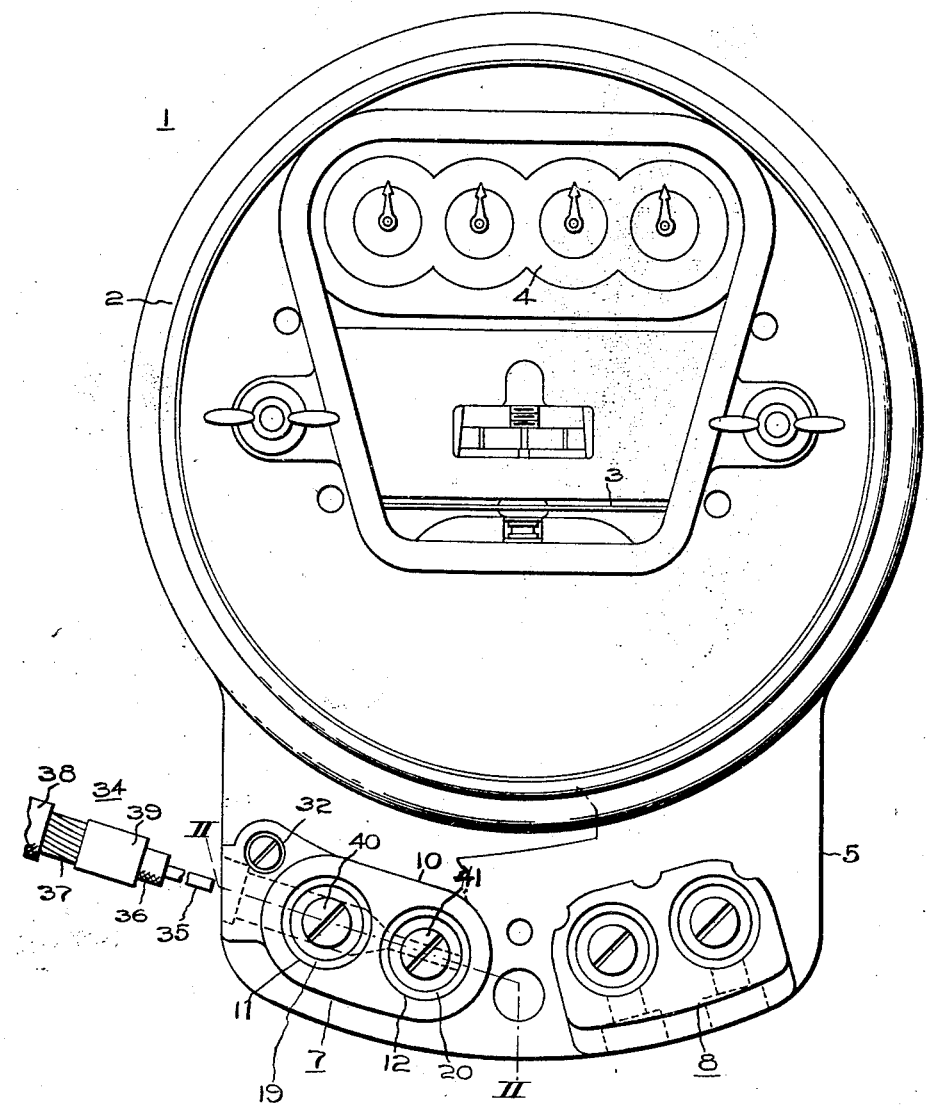

May 19, 1931.  W. BRADSHAW ET AL  1,806,327
METER TERMINAL
Filed June 27, 1925  2 Sheets-Sheet 1

WITNESSES:
R. S. Harrison
F. H. Miller

INVENTORS
William M Bradshaw and
Walter G. Mylius
BY
Wesley G. Carr
ATTORNEY

May 19, 1931.  W. BRADSHAW ET AL  1,806,327
METER TERMINAL
Filed June 27, 1925   2 Sheets-Sheet 2
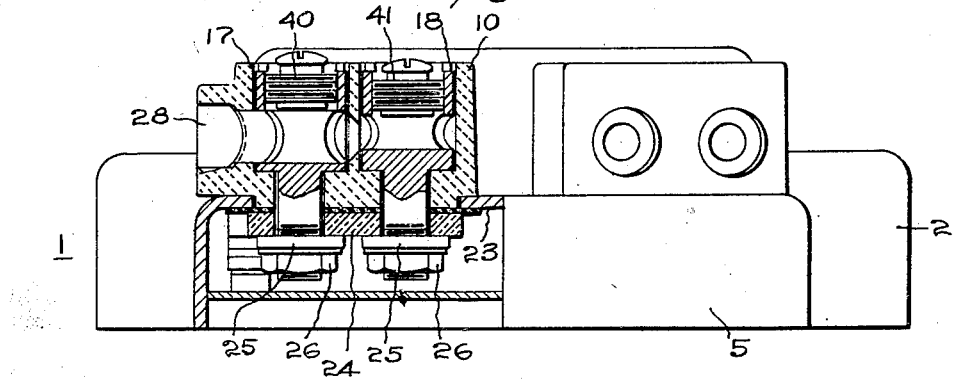
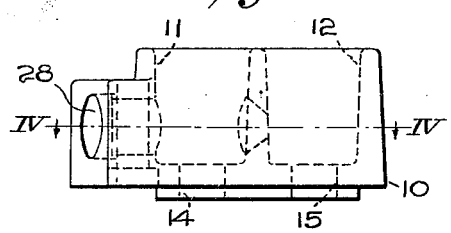
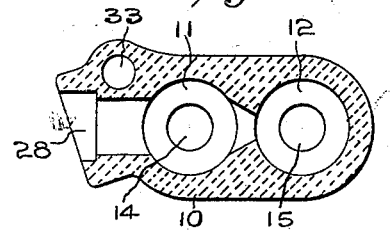
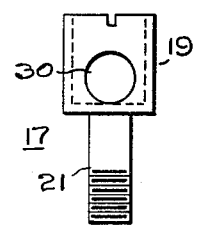
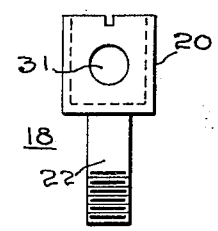
WITNESSES:
INVENTORS
William M. Bradshaw and
Walter G. Mylius
BY
ATTORNEY Patented May 19, 1931

1,806,327

UNITED STATES PATENT OFFICE

WILLIAM BRADSHAW AND WALTER G. MYLIUS, OF WILKINSBURG, PENNSYLVANIA, ASSIGNORS TO WESTINGHOUSE ELECTRIC AND MANUFACTURING COMPANY, A CORPORATION OF PENNSYLVANIA

METER TERMINAL

Application filed June 27, 1925. Serial No. 40,078.

Our invention relates to meter terminals, particularly to terminals for watthour meters.

One object of our invention is to provide a meter terminal for a watthour meter that shall prevent the theft of energy by permitting the use of concentrically arranged conductors to preclude the shunting of the meter out of circuit with the load.

Another object of our invention is to provide a terminal structure that shall facilitate the connection of concentrically arranged conductors thereto.

A further object of our invention is to provide a meter terminal that shall be simple and durable in construction, economical to manufacture and effective in its operation.

In watthour meter service, when the meters are left unattended by the power companies for any considerable length of time, there is danger, in certain localities, of the theft of energy from the meter circuit by the tapping of conductors on the meter leads so that the meter will not operate.

To prevent the above-mentioned occurrence, it has been customary to use conductors that are concentrically arranged and I have provided a connecter or terminal that will facilitate the connection of the meter in service. The terminal is of substantially bayonet type to receive the telescopically or concentrically related conductors that so protect each other as to render the tapping thereof exceedingly difficult, and practically impossible to restore to its original position if tapping is attempted.

Figure 1 of the accompanying drawings is a front elevational view of a watthour meter with the cover member of a terminal compartment thereof omitted.

Fig. 2 is a bottom view, partially in elevation and partially in section, of a portion of the device shown in Fig. 1 with the sectioned portion thereof taken along the line II—II of Fig. 1, Figs. 3 and 4 are detail elevational and sectional views, respectively, of an insulating block or terminal supporting member employed in our invention, and Figs. 5 and 6 are detail views of terminal screws or studs therefor.

The device comprises, in general, a watthour meter 1 of usual construction embodying a main casing 2 in which are disposed a rotating disc 3, a dial register 4 and the other operating parts of the instrument, and a terminal compartment 5 projecting from the casing 2. The compartment 5 may comprise a box-like sheet metal portion that is preferably integrally united with the casing 2 and is provided with openings through which two sets of terminal leads 7 and 8 extend.

The terminal leads 7, and the correlated parts thereof to which our invention more specifically relates, comprise a molded insulating block 10 having substantially cup-shape recesses 11 and 12 therein and openings 14 and 15 communicating with the recesses 11 and 12, respectively.

Studs 17 and 18 are provided with similar head portions 19 and 20, respectively, of substantially-cup-shape for disposition, respectively, in the recesses 11 and 12 in the insulating block 10, and stud portions 21 and 22 to project through the openings 14 and 15 in the block 10 and through a wall 23 of the compartment 5. The studs 17 and 18 are secured to the wall 23 by means of a plate 24, washers 25 and nuts 26.

An entering opening 28 in the block 10 has a longitudinal axis transversely intersecting the parallel axes of the studs 17 and 18. The latter are provided with openings 30 and 31 respectively of different diameters that are disposed coaxially with the axis of the opening 28. An auxiliary holding screw 32 may be provided for extension through an opening 33 in the block 10 into the wall 23.

Referring to Fig. 1, a tap or plug connector 34, for cooperation with the terminal studs 17 and 18 in the block 10 is shown in a position which it would occupy just before being inserted into operative position.

The connector 34 comprises an inner conductor 35, a body of insulation 36 thereon, a tubular conductor 37 surrounding the insulating material 36 and a body of insulating material 38 surrounding the conductor 37. The conductor 37 is preferably constructed similar to a twisted strand cable to form a homogeneous conductor of tubular form, closely impressing the insulating cover 36 of the inner conductor 35, and is provided, at its outer end, with a contact ferrule 39.

In connecting the terminal 34 to the meter, it is passed along the axis of the opening 28 until the inner conductor 35 is telescopically disposed in the opening 31 of the head portion 20 of the stud 18 and the ferrule 39 is in the opening 30 of the head portion 19 of the stud 17. In this position, clamping screws 40 and 41 disposed in the outer ends of the stud heads 19 and 20, respectively, are turned into clamping engagement with the ferrule 39 and conductor 35, respectively, after which a cover member of usual form (not shown) is placed over the terminal compartment 5 and sealed in the usual manner.

In the above described construction, the connection of the conductors 35 and 37 to their respective terminals is greatly facilitated and since the terminal 34 constitutes a plurality of alternately telescopically related insulated and conducting elements, tampering therewith as above described is rendered more difficult.

While we have shown and described particular forms of our invention changes may be effected therein without departing from the spirit and scope thereof as set forth in the appended claims.

We claim as our invention:

1. The combination with electrical apparatus comprising an insulating body, spaced insulated terminal members embedded therein having contact surfaces longitudinally spaced along, and disposed different distances laterally from, the axis of an opening in the insulating body, said body also having lateral openings therein opposite said contact surfaces, threaded metal sleeves in said lateral openings and binding screws in said sleeves, of a terminal lead comprising a plurality of conductors insulated from each other and with one conductor thereof projecting longitudinally beyond an end of another conductor and along said axis to adapt said conductors for individual cooperation with said contact surfaces.

2. In combination, a supporting-wall plate, an insulating block having an inner recess and right-angularly related openings leading thereto, one of said openings being for the reception of a removable terminal member, and a cooperating terminal stud having a portion for operative engagement with said terminal member in said recess and a portion projecting through the other opening in the block and through said wall plate for supporting the block on the plate.

3. In combination, a supporting-wall plate, an insulating block having a terminal chamber thereon and longitudinally aligned openings extending therethrough, said block also having an opening to said chamber at right angles to said aligned openings for the reception of a removable terminal member, a stud occupying said chamber and having an internally-threaded head of substantially cup shape, said stud having a lateral opening to said right-angle opening in the block, said stud also having a portion extending through said wall plate for supporting the block thereon, and a binding screw in the cup-shape portion of the stud.

4. In combination with a terminal lead embodying two concentrically related conductors one of which projects longitudinally beyond the end of the other for connection with an electro-responsive device, of terminal means on said device comprising a terminal block of insulating material having recesses therein and an opening extending laterally through said block communicating with said recesses, terminal studs in said recesses having conductor receiving portions in alignment with the axis of said opening proportioned to receive the respective concentrically related conductors, and means on said studs accessible from the face of said terminal block for securing the respective conductors thereto.

5. In combination with a terminal lead embodying two concentrically related conductors one of which projects longitudinally beyond the end of the other for connection with an electro-responsive device, of terminal means on said device comprising a terminal block of insulating material having recesses therein and an opening extending laterally through said block communicating with said recesses, terminal studs in said recesses having conductor receiving portions in alignment with the axis of said opening proportioned to receive the respective concentrically related conductors, means on said studs accessible from the face of said terminal block for securing the respective conductors thereto, and means for closing said recesses.

In testimony whereof, we have hereunto subscribed our names this 24th day of June, 1925.

WILLIAM BRADSHAW.
WALTER G. MYLIUS.